G. W. La Barr,
Miter Box,
N° 11,164.      Patented June 27, 1854.
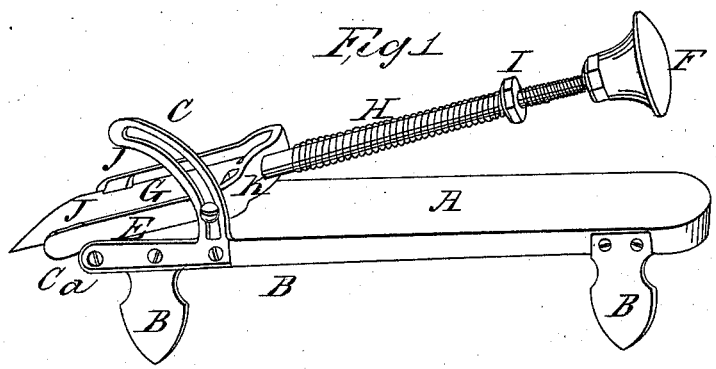
Fig. 1
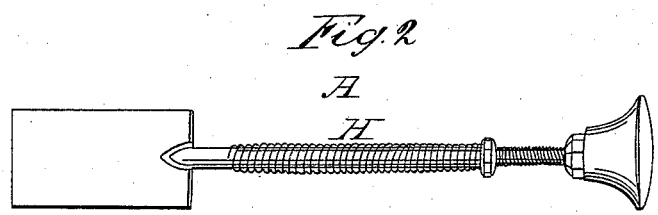
Fig. 2
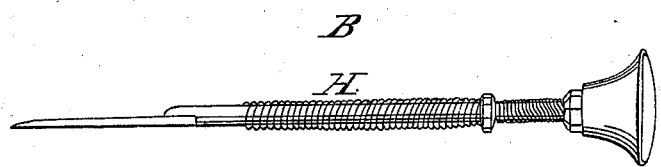

UNITED STATES PATENT OFFICE.

GEORGE W. LA BAW, OF JERSEY CITY, NEW JERSEY.

MITER-MACHINE.

Specification of Letters Patent No. 11,164, dated June 27, 1854.

*To all whom it may concern:*

Be it known that I, GEORGE W. LA BAW, of Jersey City, in the county of Hudson, State of New Jersey, have invented a new and original combination—namely, a Templet or Tool for Cutting Miters; and I do hereby declare that the following is a full, clear, and exact description thereof, reference being had to the accompanying drawings and letters of reference marked thereon.

In Figure I, A, is the stock or bed-piece of the tool or machine, that is, the piece to which the other parts are attached; and in reference to which they act. It is made of wood, iron or other suitable material. Its undersurface is made with the most caution as it is the main plane of reference and use in cutting by the machine or tool. B, B, are guides or stops, that hold or guide the holding of the templet or miter, while it is being used. The guides B, B, may be fixed and stationary as represented in the drawings, or they may be so made as to adjust the chiseled edge to an angle more or less than a right angle; or may be otherwise varied in their position to give greater facility of using the templet or miter;—that is, said right angle meaning the placing the line of the edge of the chisel at right angles to the longitudinal axis of the material to be cut. C, is the segment, or portion of a circle; made of metal or other suitable material and marked with degrees varying from nothing to ninety or more degrees; or it may be without marks, the operator using the templet, making his own marks or otherwise determining the angle at which he wishes the chisel to cut. The object of C—the segment—is to set the pitch or angle of the chisel. In the drawings it is represented (Fig. I,) as having a slot C, *a*, *x*, and a set screw D, in said slot so that the frame E, holding the chisel may be placed and fastened by the set screw, D, at any point in the slot; and thus the direction and angle of the chisel may be fixed. The center of the segment, and the point of the angle by which the frame E, and the chisel G, is fixed, is at C, *a*, E, is the frame that holds and guides the chisel G. It is made of any strong and durable material. J, J, are grooved or slotted guides at the lower extremity of the frame, and hold the chisel in the frame. The points C, *a*, and C, *a*, *a*, are the hinges on which the frame turns. The frame incloses the chisel on three sides and has a round hole at K, which receives the handle of the chisel, said hole with the chisel handle further guiding the chisel, while cutting. H, is a spring on the chisel handle to retract the chisel, and the force of the spring is regulated by the set screw I, which moves on the thread cut on the handle. F, is a knob to receive the blow of the chisel or other mode of applying power or force to the chisel. As equivalents I describe any wood, iron, brass or other frame whether made with the exact slotted guides J, J, or not, and whether there be a hole at K in the frame or not. Any frame substantially the same; or any apparatus of mechanical means producing the same end. As to angle, I describe as equivalents a chisel fixed at any one angle without the segment C and the set screw D. That is that virtually makes a tool or machine cutting a miter of any arc; or of more than one angle. So of the slot C, *a*, *x*, and the handle; and the knob; while I describe them, I do so knowing and expressing the fact, that, some or all may be varied, and some may be omitted altogether. At K, in the frame E, is a circular hole through which a portion of the chisel handle slides, when the chisel cuts. The united action of the guide pieces J, J, and the frame for the chisel, E, and the sliding of the rounded handle of the chisel through the hole at K, is to cause the chisel to move on a plane; and said plane is one side of an angle between two planes meeting at the center C, *a;* while the other side of the angle is the medium plane of the bed piece or stock described.

In Fig. II, A, is an anterior view of the chisel, represented as out of its frame and separated from the stock, and B, is a lateral view of the same, showing that the chisel is represented as a thin firmer. I now further describe a mortising chisel or any other chisel as an equivalent thereunto. H, is a spring on the chisel handle seen at A and B, Fig. II. Also the knob is seen, to receive the blow of the mallet, or of the hand or other source of power, that moves the chisel.

The elements of the machine or tool are the stock to hold the templet or miter in its place on the material to be cut; the stop guides, that help to hold the tool or machine on the material; the segment to regulate and determine the angle or bevel cut by the chisel; the chisel to cut the material; the spring handle to operate the chisel; and the frame to guide the chisel. Any one or all; any portion necessary to produce the desired result of cutting miters or bevels by an integral hand tool or machine.

The operation of the templet, bevel or mitering tool or machine, is as follows. I take the material to be cut, for example, moldings to be inserted into the panels of doors. If the molding is slight or small, I cut it directly into shape by the tool or machine described. If the molding is large and heavy; as for a large door I saw it in a miter box. Then if the panel of the door is square, that is has right angles at its corners, I set the chisel by the segment C and the set screw D; holding the frame E, and the chisel, &c., at an angle of 45 degrees. Then placing the stop guides against the molding, I apply power to the knob F, and thus cut or pare smoothly, and nicely the miter or bevel, or angle required; producing an accurate and complete fitting of the molding to the panel of the door. So of any other angle or any other kind of work.

Thus with necessary modifications, I apply the tool or machine to all the work it is capable of executing; and thereby secure beauty of finish; as well as saving of time in the operation.

I claim—

The combination and arrangement in the manner described; or in any manner equivalent thereunto, of the several specific parts; or their equivalents, of the hereinbefore described miter machine; without limiting myself to any particular arrangement of parts, for the purpose set forth.

Jersey City, April 24th, 1854.

GEOR. W. LA BAW.

Witnesses:
 WM. H. JELLIFF,
 WILLIAM POWELL.